Aug. 19, 1958     R. M. SACHS ET AL     2,848,191
NOZZLE BOX

Filed Nov. 3, 1951     2 Sheets-Sheet 1

INVENTORS
R. M. SACHS
L. C. SECORD
PER
ATTORNEY.

INVENTORS
R. M. SACHS
L. C. SECORD

United States Patent Office 2,848,191
Patented Aug. 19, 1958

2,848,191

NOZZLE BOX

Robert Mitchell Sachs and Lloyd Calvin Secord, Toronto, Ontario, Canada, assignors to A. V. Roe Canada Limited, Malton, Ontario, Canada, a corporation Application November 3, 1951, Serial No. 254,712

2 Claims. (Cl. 253—39.1)

This invention relates to improvements in nozzle boxes for gas turbine engines with particular reference to such engines for use in aircraft, where lightness and small overall diameter are of major importance.

Such engines normally embody a compressor, a combustion system and a turbine, arranged coaxially and mounted upon a main structural member known as the backbone member. This hollow member surrounds the shaft that couples the turbine and the compressor and supports the main bearings of the shaft; the combustion system is arranged externally around the backbone member. While the primary function of the nozzle box in this construction is to conduct hot gases from the combustion system to the turbine nozzle guide vanes it also provides a structural connection between the backbone member and the exhaust cone and other components of the aft structure; in certain applications the nozzle box is further utilized to carry the mounting pads for the main engine supports. The nozzle box is so situated that it surrounds the main turbine bearing and it is customary to cool this bearing by a stream of air flowing through the backbone member; the waste cooling air must therefore be discharged through or around the nozzle box structure. In engines embodying axial flow compressors enabling the combustion chambers to be placed in a substantially axial direction, the overall diameter of the nozzle box is a critical factor and placing a manifold directly on the nozzle box would normally result in an excessive overall diameter of the assembly. For this reason it is usually necessary to conduct the waste air from the region of the nozzle box to a manifold situated around the exhaust cone. Thus it will be seen that it is normally necessary to incur some weight penalty and complication in providing the usual piping and manifold at the exhaust cone in order to dispose of the waste air from the turbine bearing.

It is an object of this invention to provide means for the disposal of the waste air from the turbine bearing which will not materially increase the weight and diameter of the nozzle box while eliminating the piping installation normally required. It is a further object of the invention to provide a waste air installation which is particularly well suited to those instances wherein the mounting pads for the main engine supports are carried elsewhere than on the nozzle box, e. g. on the engine backbone member; in such circumstances no provision need be made to accommodate highly concentrated local loading and it is possible to effect a great saving in weight of the nozzle box structure and to adopt a construction of sheet material of relatively thin gauge in place of the more conventional heavy castings.

These objects are achieved by a nozzle box having an outer casing and an inner casing spaced from the outer casing and surrounding a source of waste cooling air, and having air conductors extending from the inner casing to the outer casing, characterized in that a duct is incorporated peripherally in the outer casing, the air conductors connecting the source of air to the duct, and an outlet is provided for discharging the air from the duct.

The invention will be more readily understood from consideration of the following description of a preferred application.

In the accompanying drawings which form a part of this application and in which like reference characters designate like parts throughout the same, Fig. 1 is a side elevation of a gas turbine engine showing the situation of the nozzle box in the general construction;

Figure 1:
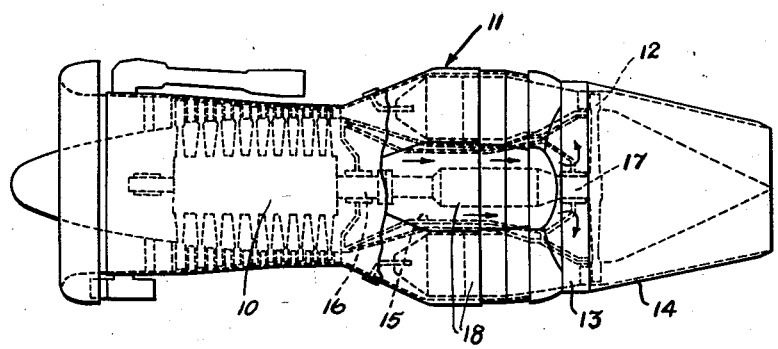
Figure 4:
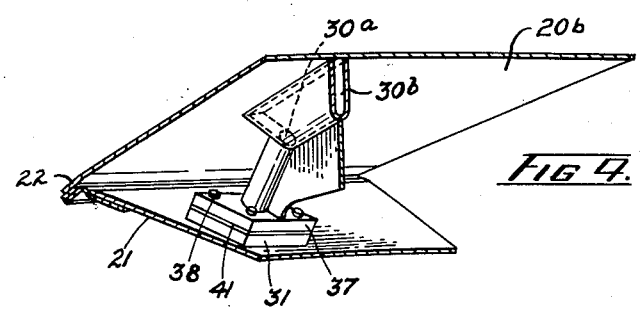
Fig. 4 is a fragmentary sectional view taken through the struts shown in Fig. 2.

The principal components of the engine illustrated in Fig. 1 are an axial compressor 10, a combustion system 11, and a turbine 12. The nozzle box 13 connects the exhaust cone 14 to the backbone member 15, the backbone member being the chief structural member of the engine supporting the bearings 16 and 17. It will be noted from this drawing that the combustion system 11 includes six combustion chambers 18.

Figure 2:
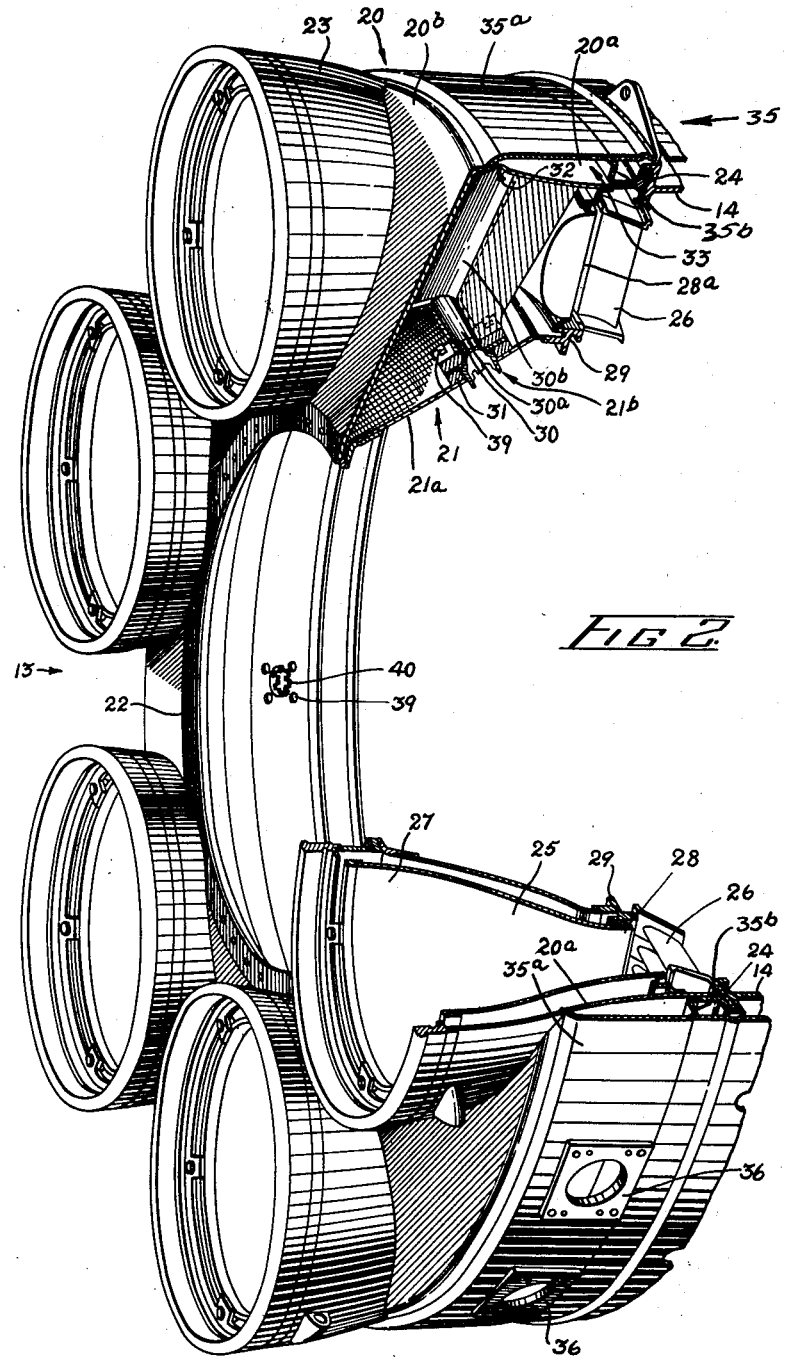
Fig. 2 is a partially sectioned side view of a nozzle box embodying a duct or manifold in accordance with this invention.

The nozzle box as illustrated in Fig. 2 comprises essentially an outer casing 20 and an inner casing 21, bolted together at the flange 22. The casings together form a channel-sectioned annulus with generally axially-directed cylindrical outer and inner side walls 20$^a$ and 21$^a$ joined by the generally radially disposed annular wall 20$^b$.

The whole assembly is mounted on the backbone member 15 by bolts through the flange 22. Symmetrically disposed around the annular wall 20$^a$ are six cylindrical port structures 23 which are adapted to register with the six combustion chambers 18. At its outer perimeter the outer casing 20 supports the rear structure of the engine through the mounting flange 24 on the outer wall 20$^a$.

Between the inner and outer casing are situated six liners 25 which guide the hot gases from the combustion chambers to the turbine nozzle guide vanes 26 in Fig. 2. Each liner has a cylindrical inlet portion 27 which fits into one of the cylindrical port structures 23 on the outer casing 20 and the shape of which blends into that of the outlet portion 28 which takes the form of an annulus sector having radially-disposed end walls 28$^a$. The outlet portions 28 of the six liners 25 are placed with the end walls 28$^a$ in contact, and together they form an annulus adapted to lie within the inner circumference of the rear of the outer casing 20 and facing the nozzle guide vanes 26.

The inner casing 21 has an annular rim 29 at the rear edge of the inner side wall 21$^a$ to support the inner mounting of the nozzle guide vanes, and the side wall 21$^a$ has apertures 21$^b$ axially aligned with the spaces between the port structures. The outer side wall 20$^a$ has apertures 32 corresponding to and radially aligned with those in the inner side wall.

The inner and outer casings are further connected by rigid hollow struts 30 extending substantially radially from the outer wall 20$^a$ to pads 31 surrounding the apertures 21$^b$ in the inner wall 21$^a$. The struts are situated in the spaces separating those portions of the individual liners 25 lying between the cylindrical forward portions 27 and the abutting rear portions 28. Preferably these struts are formed integrally with outer casing 20 and each strut includes a tubular part 30$^a$ and channel-section part 30$^b$ which registers with one of the apertures 32 in the outer casing. The walls of the struts surround an aperture in each of the side walls so that there are open passages from the region encircled by the inner casing 21 through the apertures 21b, the struts 30 and the apertures 32.

The longitudinal edges of the channel section part 30b of the struts 30 at the open side of the channel-section lie against the annular wall 20b to close in the said open side and dispose the flow path for the cooling air in contact with the said annular wall.

The apertures 32 discharge into a closed annular passage or manifold 33 in the outer side wall 20a. In the construction shown, the passage is defined by the outer side wall 20a and an annular channel-section ring 35; the ring 35 has a cylindrical exterior wall 35a and annular flanges 35b extending to the outer side wall 20a and welded or the like to it so that it becomes an integral part, in effect, of the outer casing. Outlet adapter pads 36 are provided on the outer surface of the duct for attachment to the waste air exhaust pipes (not shown).

Figure 3:
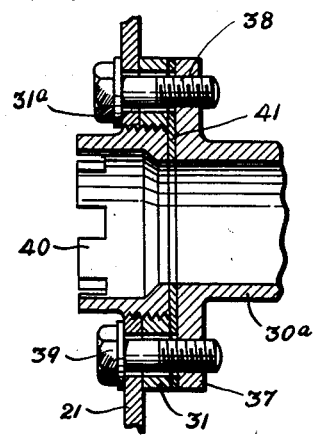
Fig. 3 is a sectional view taken diagonally of a pad on the nozzle box, showing the attachment of a strut to the inner casing of the nozzle box.

Details of the method whereby the tubular portion 30a of one of the struts 30 is attached to the inner casing 21 are shown in Fig. 3. A flange 37 provided at the inner end of strut 30 embodies four tapped holes 38; the holes 38 accommodate bolts 39 which pass through the bolt holes 31a on the pad 31 on the inner casing 21 and secure the flange to the casing. The bolt holes 31a in the pad 31 are somewhat larger in diameter than the bolts 39 so that there is lateral play between the strut 30 and the inner casing. The air hole in the centre of the pad 31 is tapped to receive a castellated hollow screw 40 the internal diameter of which is substantially equal to the internal bore of the tubular portion 30a of the strut 30. Between the inner face of the castellated screw 40 and the flange 37 on each of the struts there is a compressible packing washer 41.

In assembling the casings the bolts 39 are inserted and tightened sufficiently to secure the flange 37 to the inner casing 21 without deformation; the dimensions of the parts are so chosen that such tightening will not result in actual contact between the flange 37 and the casing. The castellated screws are inserted in the air holes in the pads 31 and tightened until each packing washer 41 is bedded against the face of the corresponding flange 37 to make a gas tight joint without applying excessive tension to the bolts 39; with this construction exact alignment between the tubular portions 30a of the struts and the air holes in the pads 31 is not required.

From the foregoing description it will be understood that the cooling air for the bearings which is bled from a suitable stage of the compressor and ducted into the backbone member will pass down the said member to the turbine bearing 17 and after flowing through this bearing it will enter the region surrounded by the inner casing 21 of the nozzle box. This region is bounded towards the rear by a baffle, excluding a region more highly pressurized to prevent the hot gases passing through the nozzle guide vanes from leaking radially inwardly, and therefore the waste cooling air can escape only through the struts 30 into the passage 33. This waste air is then discharged from the duct through the outlet adapters 36.

The nozzle box described is not required to carry the mounting pads for the main engine supports and therefore it may be constructed of sheet material of relatively thin gauge. In such circumstances it is undesirable that any form of elbow or localized adapter should be attached to the wall 20a of the outer casing at each of the apertures 32 and therefore a manifold or duct of the type described, which avoids all localized loading on the thin wall of the outer casing, is most advantageous. In addition it is possible by this means to construct a duct or manifold of relatively flat cross-sectional form while retaining the required cross sectional area, and thereby to avoid any material increase in the overall diameter of the nozzle box casing; in fact, the diameter of casing including the duct is materially less than the diameter of a circle enveloping the cylindrical port structures 23.

It will be appreciated that the introduction of the waste air into the passage 33 by the apertures 32, situated in the wall 20a of the outer casing, which constitutes itself the inner wall of the duct, eliminates all external piping which would be required to lead the waste air into the manifold externally and around the nozzle box structure.

It is to be understood therefore that the form of the invention herewith shown and described is to be taken as a preferred example of the same and that various changes in the shape, size and arrangement of the parts may be resorted to without departing from the spirit of the invention and the scope of the subjoined claims.

What we claim as our invention is:

1. A nozzle box structure for a gas turbine engine, comprising an outer casing having a generally radially disposed annular wall and a generally axially directed side wall connected to the outer circumference of the annular wall, an inner casing having a generally axially directed side wall and connected to the inner circumference of the annular wall and surrounding a source of waste cooling air, the casings together forming a channel-sectioned annulus having substantially cylindrical side walls, an open side directed downstream of the engine, the annular wall having spaced-apart port structures projecting into said nozzle box structure for the intake of heated air and the side walls having apertures axially aligned with the spaces between the port structures, substantially radially-extending rigid hollow struts rigidly secured at their ends to the axially extending side walls of the annulus with the wall of each of the struts surrounding one of said apertures in each of the side walls, a channel-section ring secured to the outer side wall to define with a part of the said wall an annular passage in communication with the interiors of the hollow struts and having a cylindrical wall radially spaced from the outer side wall and annular flanges extending from the cylindrical wall to the outer side wall of the casing annulus, and an opening in the cylindrical wall providing an outlet for discharging air, the hollow struts and the annular passage together providing a flow path for the said waste cooling air in contact with the walls of the struts and passage, including the outer side wall of the annulus.

2. A nozzle box structure as claimed in claim 1 in which the wall of each of the struts for a part of its length is of channel-section and the longitudinal edges of the said strut wall at the open side of the channel-section lie against the annular wall of the said annulus to close in the said open side and dispose the flow path for the cooling air in contact with the said annular wall.

References Cited in the file of this patent

UNITED STATES PATENTS

| | | |
|---|---|---|
| 2,479,573 | Howard | Aug. 23, 1949 |
| 2,494,821 | Lombard | Jan. 17, 1950 |
| 2,608,057 | Boyd et al. | Aug. 26, 1952 |
| 2,614,384 | Feilden | Oct. 21, 1952 |
| 2,672,013 | Lundquist | Mar. 16, 1954 |